(12) United States Patent
Cox et al.

(10) Patent No.: US 9,465,827 B1
(45) Date of Patent: Oct. 11, 2016

(54) PROXIMITY BASED MANAGEMENT SERVICES

(71) Applicants: Timothy J. Cox, Mendon, MA (US); Scott E. Joyce, Foxboro, MA (US); Donald E. Labaj, Northborough, MA (US)

(72) Inventors: Timothy J. Cox, Mendon, MA (US); Scott E. Joyce, Foxboro, MA (US); Donald E. Labaj, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 700 days.

(21) Appl. No.: 13/785,625

(22) Filed: Mar. 5, 2013

(51) Int. Cl.
*G06F 17/30* (2006.01)
*G06K 7/10* (2006.01)

(52) U.S. Cl.
CPC ..... *G06F 17/30312* (2013.01); *G06K 7/10099* (2013.01)

(58) Field of Classification Search
CPC .............. G06K 7/10099; G06K 17/30312
USPC ........................................ 340/572.1
See application file for complete search history.

(56) References Cited

U.S. PATENT DOCUMENTS

| | | | |
|---|---|---|---|
| 6,150,921 A | 11/2000 | Werb et al. | |
| 6,456,239 B1 | 9/2002 | Werb et al. | |
| 6,812,824 B1 | 11/2004 | Goldinger et al. | |
| 7,119,738 B2 | 10/2006 | Bridgelall et al. | |
| 8,971,916 B1 * | 3/2015 | Joyce | G06F 3/067 455/41.2 |
| 2002/0170969 A1 * | 11/2002 | Bridgelall | G06K 7/10386 235/462.13 |
| 2005/0285739 A1 * | 12/2005 | Velhal | G08B 21/0227 340/572.1 |
| 2007/0023512 A1 * | 2/2007 | Miller | G07G 1/009 235/385 |
| 2008/0122621 A1 * | 5/2008 | Archer | G06Q 10/08 340/572.1 |
| 2008/0291023 A1 * | 11/2008 | Anderson | G06Q 10/087 340/572.1 |
| 2009/0160622 A1 * | 6/2009 | Bauchot | G06K 7/0008 340/10.32 |
| 2011/0145631 A1 * | 6/2011 | Shankar | G06F 11/0709 714/4.11 |
| 2012/0188052 A1 | 7/2012 | Rosenblatt et al. | |

OTHER PUBLICATIONS

Article entitled "A Collection of SCCM Collection Queries", by Bennett, dated Oct. 24, 2011.*
Article entitled by "Please help with SCCM Query—Hard Drive Search", by Jones, dated Dec. 14, 2011.*
CILICO Electronics Co., Ltd, "CM380 Industrial Android Mobile Phone," http://www.cilico.us/search.ashx?ks=cm380&page=1&tid=0, Mar. 25, 2013, 1 Page.
CILICO Electronics Co., Ltd, "UHF RFID Reader PDA," http://www.cilico.us/products/ubf-rfid-reader-pda.html, Mar. 25, 2013, 1 Page.
Serialio.com, "Scanfob Ultra-BB2," http://serialio.com/products/RFID/Mobile/scanfob/ScanfobUltraBB2.php, Mar. 25, 2013, 3 Pages.

* cited by examiner

*Primary Examiner* — Mahesh Dwivedi
(74) *Attorney, Agent, or Firm* — Muirhead and Saturnelli, LLC

(57) ABSTRACT

Described are techniques for determining a list of data storage systems. Filtering criteria is used and includes a distance threshold and associated distance condition denoting a distance with respect to the management device. A set of one or more data storage systems meeting the filtering criteria is determined. Information is displayed regarding the set of data storage systems.

18 Claims, 8 Drawing Sheets

PROXIMITY BASED MANAGEMENT SERVICES

BACKGROUND

1. Technical Field

This application relates to techniques used in connection with system management such as in connection with data storage system management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations.

SUMMARY OF THE INVENTION

In accordance with one aspect of the invention is a method for determining a list of data storage systems comprising: receiving, at a management device, filtering criteria including a distance threshold and associated distance condition denoting a distance with respect to the management device; determining a set of one or more data storage systems meeting the filtering criteria; and displaying information regarding the set of data storage systems. Each data storage system of the set may be included in a plurality of data storage systems where each of the plurality of data storage systems may include a radio frequency identification tag that transmits a unique identifier uniquely identifying said each data storage system to a tag reader. The tag reader may be included as an integrated component of the management device or may otherwise be in electronic communication with the management device. The method may also include receiving, by the tag reader, a plurality of unique identifiers transmitted from a plurality of radio frequency identification tags, each of the plurality of radio frequency identification tags being included on a different one of the plurality of data storage systems and used to uniquely identify said different one of the plurality of data storage systems; determining a distance of each of the plurality of radio frequency identification tags from the tag reader whereby the distance is a distance between the tag reader and one of the data storage systems including said each radio frequency identification tag; and determining, in accordance with the filtering criteria, a first set of one or more of the plurality of unique identifiers each associated with one of the plurality of radio frequency identification tags. Each data storage system included in the set of one or more data storage systems may be uniquely identified by one of the unique identifiers included in the first set, and a first of the plurality of radio frequency identification tags that transmits the one unique identifier may be included in the data storage system. The step of determining, in accordance with the filtering criteria, the first set of one or more of the plurality of unique identifiers each associated with one of the plurality of radio frequency identification tags may include determining whether a distance of each of the plurality of radio frequency identification tags from the tag reader is in accordance with the distance threshold and distance condition. The filtering criteria may specify to include a data storage system in the set if the data storage system is more than the distance threshold. The filtering criteria may specify to include a data storage system in the set if the data storage system is less than the distance threshold. The filtering criteria may include one or more other criteria and may include any of a utilization metric, a metric related to health of a data storage system, a metric related to storage capacity of a data storage system, criteria related to software on a data storage system, criteria related to configuration information of a data storage system. The filtering criteria may include criteria related to any of a power source of a data storage system, physical drive information, data replication information and logical storage configuration information. The distance from the tag reader determined for each of the plurality of radio frequency identification tags may be determined using one or more signals transmitted from each radio frequency identification tag. The method may include obtaining additional information for each data storage system including one of the plurality of radio frequency identification tags determined to have an associated distance from the tag reader that is in accordance with the distance threshold and distance condition.

In accordance with another aspect of the invention is a system comprising: a plurality of data storage systems, each of the plurality of data storage systems including an identification tag that wirelessly transmits information including a unique identifier uniquely identifying said each data storage system; a tag reader that reads signals transmitted wirelessly by identification tags; and a management device comprising a processor and a non-transitory computer readable medium including code stored thereon for: receiving filtering criteria including a distance threshold and an associated distance condition denoting a distance from any of said tag reader and the management device; determining a set of one or more of the plurality of data storage systems meeting the filtering criteria; and displaying information on the management device regarding the set of data storage systems. The non-transitory computer readable medium of the management device may further comprise code stored thereon for controlling operation of the tag reader, whereby the tag reader receives a plurality of unique identifiers each transmitted wirelessly by an identification tag included on one of the plurality of data storage systems and the step of controlling may provide for the tag reader communicating the plurality of unique identifiers to the management device. The non-transitory computer readable medium of the management device may further comprise code stored thereon for: determining a distance between each of a plurality of identification tags that wirelessly transmits one of the plurality of unique identifier and any of said tag reader and said management device, wherein said distance represents a distance between one of the plurality of data storage systems including said each identification tag and any of said tag reader and said management device; determining an address of one of the plurality of data storage systems using one of the unique identifiers; and communicating with said one data storage system using said address to obtain additional information regarding said one data storage system. The identification tag included on each of the plurality of data storage systems may be any of read-only, read-write, and write once read many and the identification tag is any of a radio frequency identification tag and an infrared identification tag.

In accordance with another aspect of the invention is a non-transitory computer readable medium comprising code stored thereon for determining a list of data storage systems, the non-transitory computer readable medium comprising code stored thereon for: receiving at a management device filtering criteria including a distance threshold and associated distance condition denoting a distance from the management device; determining a set of one or more data storage systems meeting the filtering criteria; and displaying information regarding the set of data storage systems. Each data storage system may include a radio frequency identification tag that transmits a unique identifier uniquely identifying said each data storage system to a tag reader. The tag reader may be included as an integrated component of the management device or may be otherwise in electronic communication with the management device. The non-transitory computer readable medium may further comprise code for: receiving, by the tag reader, a plurality of unique identifiers transmitted from a plurality of radio frequency identification tags, each of the plurality of radio frequency identification tags being included on a different one of the plurality of data storage systems and used to uniquely identify said different one of the plurality of data storage systems; determining a distance of each of the plurality of radio frequency identification tags from the tag reader whereby the distance is a distance between the tag reader and one of the data storage systems including said each radio frequency identification tag; and determining, in accordance with the filtering criteria, a first set of one or more of the plurality of unique identifiers each associated with one of the plurality of radio frequency identification tags.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
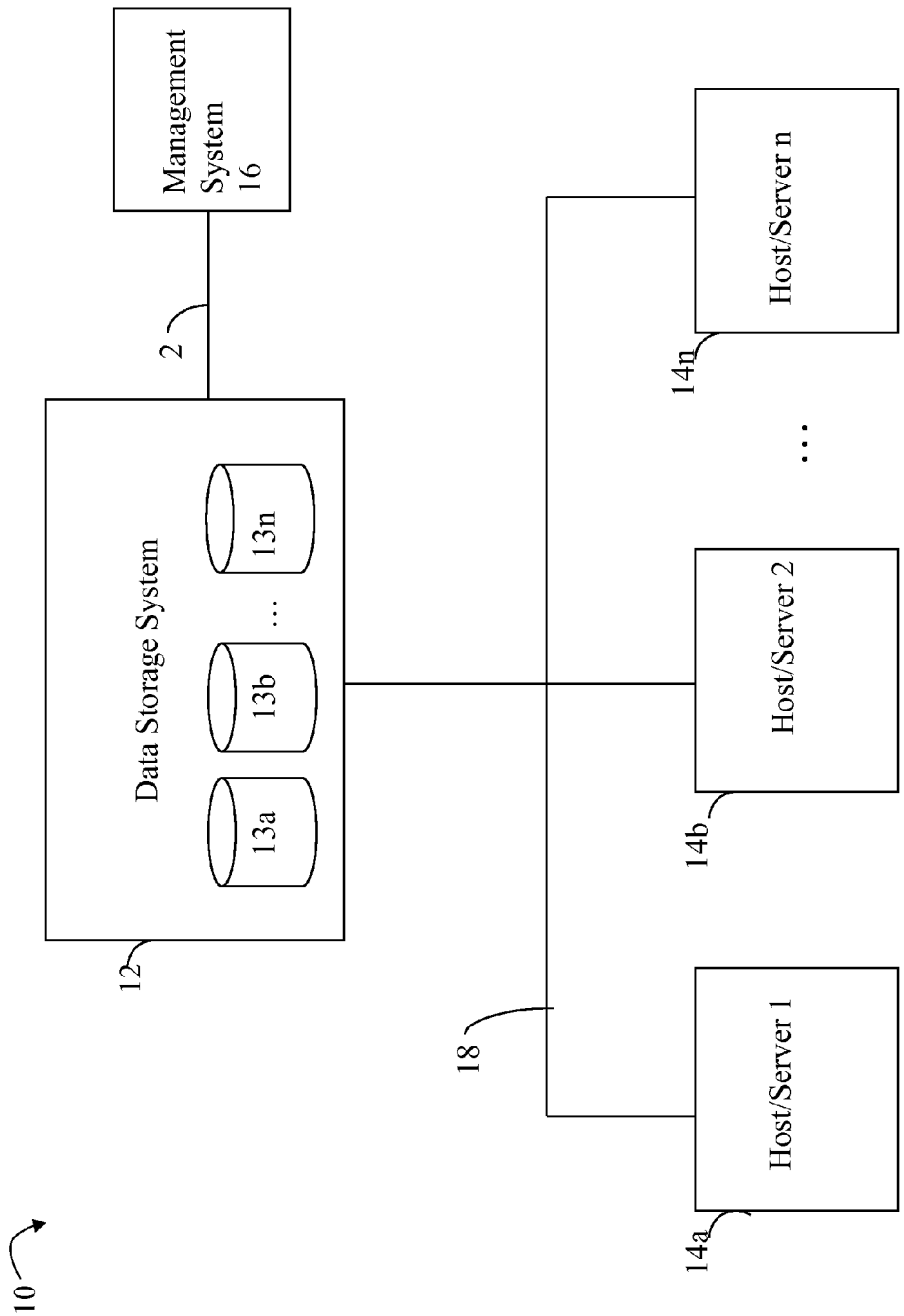
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
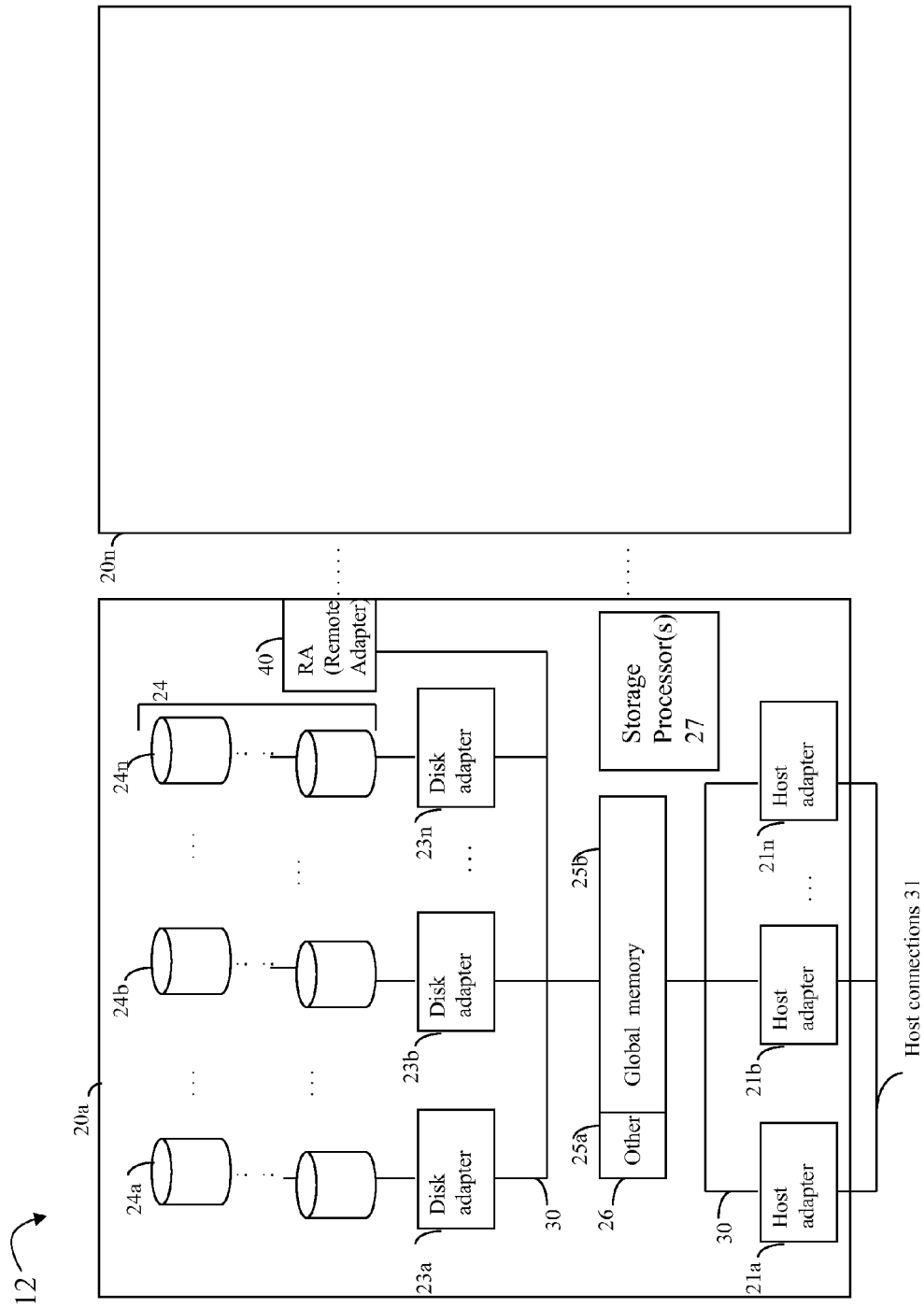
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses or other internal connections 30 and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Management software may execute on the data storage system and/or management system. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like.

What will now be described are techniques for performing proximity based management services allow an administrator or manager, such as of one or more data storage systems, to easily locate and manage the systems based on the proximity of such systems to a management device, such as a computer system, mobile phone, and the like, including management software executing thereon. For example, in some embodiments in accordance with techniques herein, the administrator with the management device may walk through a laboratory of storage systems managed by the administrator. The management software executing on the management device may, for example, automatically filter and display a list of the data storage systems within a particular distance or in close proximity. Such information may be displayed automatically in accordance with pre-defined or previously defined filtering criteria so that there is no need to have the administrator manually enter or select such filtering criteria or otherwise manually perform tasks such as scan a barcode attached to the data storage system to obtain such information. As will be described in more detail in following paragraphs, one exemplary use of techniques herein provides for automatically displaying on the management device the filtered list of data storage systems and associated information. The filtering criteria may include, for example, distance-based criteria such as one or more distance thresholds (e.g., 5 feet, 100 feet) and/or distance ranges (e.g., between 10 and 100 feet) and associated logical conditions (e.g., less than the specified distance threshold, more than the specified distance threshold). The filtering criteria may also include other criteria, such as related to the performance and/or health of the data storage systems. Use of such filtering criteria in accordance with techniques herein provides for easily locating and managing systems in a laboratory. In some embodiments, one or more parameters may be configurable such as, for example, the number of data storage systems displayed, the distance criteria (e.g., distance threshold(s) and associated conditions (e.g., less than, more than, equal to).

Techniques herein may be used to facilitate data storage system management of data storage systems, such as data storage arrays, appliances, and the like. As noted above, the manager or administrator may have a management device including a processor which executes management software thereon. The management device may be a portable device such as a laptop computer or tablet, phone, or other device including a computer processor and management software as described in connection with the management software of the management system 16 above. As described in following paragraphs, the management software on the management device provides for displaying a list of data storage systems whereby the list is a filtered view based on filtering criteria such as, for example, based on proximity between the management device and the data storage systems. Generally, the management device may be any suitable device upon which the management software may be executed, such as by a processor, for use with techniques herein. A data storage system manager with a management device may, for example, frequently go into laboratory including many different systems and the manager may want to know what data storage systems are nearby. To facilitate the foregoing, an embodiment using techniques herein may automatically provide, such as via a display on the management device, a list of one or more data storage systems which are within a particular distance or range. Such distance may be included in filtering criteria used in selecting what one or more data storage systems are included in the list displayed on the management device.

The distance may be included alone or possibly in combination with other information specified in the filtering criteria. The distance may be specified using any suitable unit of measurement(s) (e.g., feet, meters) and may be specified using associated conditions such as logical or comparative operations (e.g., equal to, less than, more than, greater than, or any symbolic equivalents such as +<>). The filtering criteria may be predetermined or otherwise specified, such as by a user, prior to use with techniques herein. In this manner, some embodiments in accordance with techniques herein may automatically display the list of data storage systems on a display of the management device as the user walks through a building, in different laboratories or rooms and/or near different data storage systems based on such predetermined or previously specified filtering criteria.

The filtering criteria may be specified using default settings or values which may be input from a default settings file, user inputs, and the like. Such filtering criteria may be configurable, such as modified by a user of the management device. When the code of the management software is executing, such as while the user walks through different laboratories including data storage systems, the management software may automatically display the list of data storage systems filtered in accordance with current settings of the filtering criteria. In this manner, a user may be automatically provided with a list of data storage systems in accordance with the predetermined or previously specified filtering criteria without requiring the user to manually enter such criteria at the time the user want to view a filtered list of data storage systems.

Figure 3:
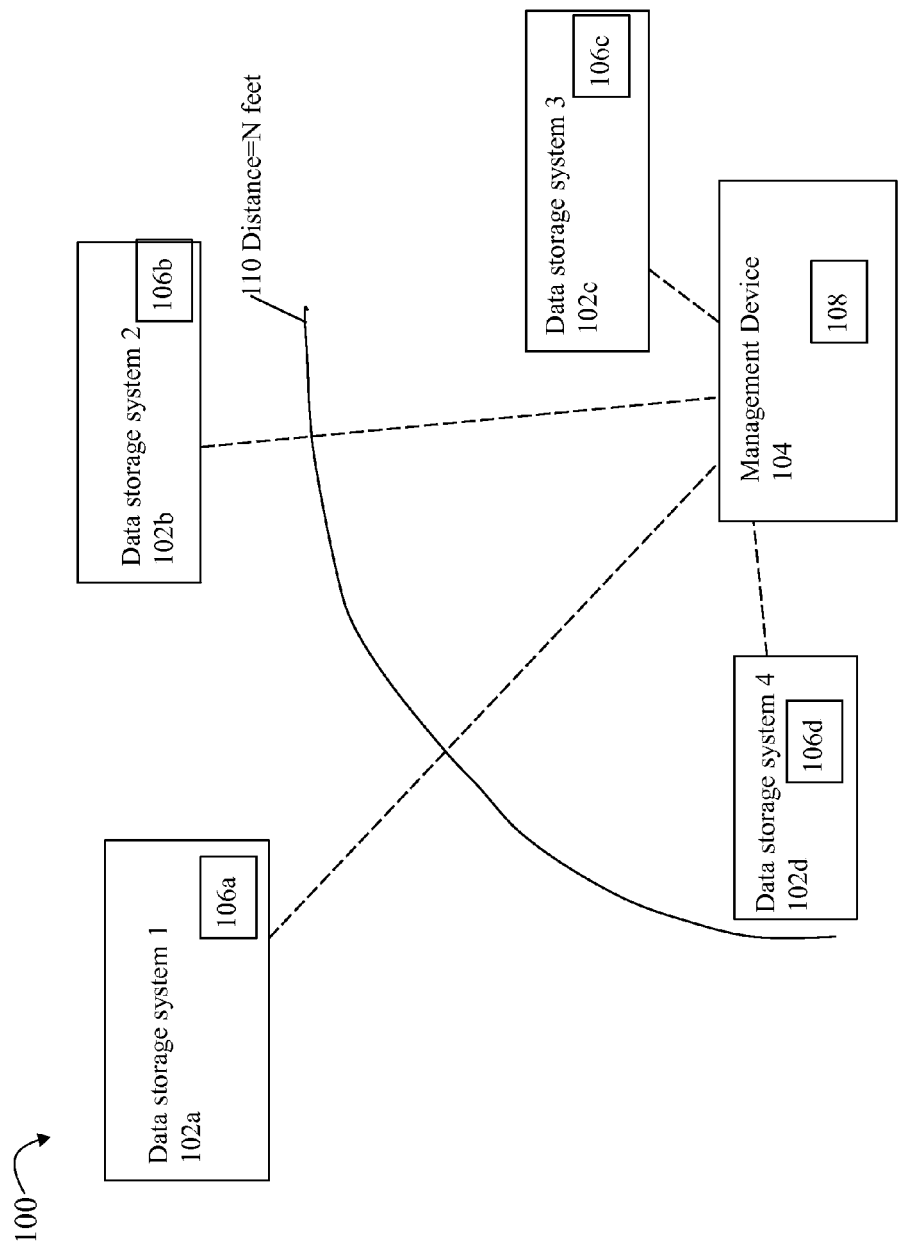
FIG. 3 is an example illustrating use of techniques herein with a management device and multiple data storage systems.

Referring to FIG. 3, shown is an example 100 illustrating use of techniques herein. The example 100 includes data storage systems 102a-102d and management device 104. The data storage systems 102a-d may be located in a laboratory such as used in connection with software development and/or testing, or located in a data center of a company, and the like. With reference back to FIGS. 1 and 2, element 12 may represent the data storage system 102a-d. Element 110 represents the distance threshold of N feet (N representing a numeric value or quantity such as 10) specified as the filtering criteria. In accordance with techniques herein, a list of any data storage systems within the specified distance threshold, such as less than N feet from the management device 104, may be displayed on the management device. In connection with this example, a list identifying data storage systems 102c and 102d may be displayed on the management device 104. As described above, the filtering criteria may be predefined or previously specified so that the management software may automatically display the list of data storage system without requiring the user to manually enter such filtering criteria each time the user desires to list the data storage systems on the management device. As described in more detail below, each of the data storage systems 102a-d may include, respectively, RFID (radio frequency identification) tags 106a-d and the management device 104 may include an RFID reader 108, such as an integrated component of the management device 104. In some embodiments, the management device 104 may otherwise be coupled to, or in electronic communication with, an RFID reader 108. As described elsewhere herein in connection with the management system 16 of FIG. 1, the management device 104 and management system 210 may include management software used to manage the data storage systems in accordance with techniques herein.

An embodiment in accordance with techniques herein may use RFID to determine and identify those data storage systems nearby the management device (e.g., within a particular distance from the management device). As known in the art, an RFID system may be characterized as a wireless non-contact system that uses radio-frequency electromagnetic fields to transfer data from an RFID tag, such as attached to an object. An RFID system may include an antenna and transceiver which read data transmitted by a transponder via radio frequency (RF). The combined transceiver and antenna may be referred to as an RFID reader. The transponder may be referred to as the RFID tag which may be an integrated circuit containing RF circuitry. The RFID tag may transmit data when it comes within the electric or magnetic field of the antenna of the reader. The antenna may then transmit the data to a processing unit whereby such data may be further processed such as for use with techniques herein. The RFID reader may be connected to, or in electronic communication with, a processing unit or a computer's communication port. Commands may be sent, for example, from the computer to the reader which then activates the transponder or RFID tag. The RFID tag transmits a signal response that is read by the RFID reader, which may transmits the data encoded in the signal response to the computer for further processing.

Each of the data storage systems 102a-102d may include, respectively, RFID tags 106a-d. The RFID tags may be physically attached to or embedded within the data storage systems. The RFID tag attached to a particular data storage system may contain electronically stored information regarding that particular data storage system and may transfer such information from the tag to an RFID reader. The RFID tag may transmit signals in the form of radio-frequency magnetic fields to the RFID reader.

Different types of RFID tags may be used depending on the distance range from which the RFID signal of a tag is read by the RFID reader. For example, some tags require no battery and may be powered to read at short ranges via magnetic fields or electromagnetic induction. Such RFID tags may be referred to as passive which have no battery and draw power from the RFID reader which sends out electromagnetic waves that induce a current in the tag's antenna. Other RFID tags, referred to as active RFID tags, may have a local power source, such as a battery, and emit radio waves. The power source is used to run the microchip circuitry of the RFID tag and to broadcast the signal to the RFID reader. Semi-passive tags may refer to RFID tags that include a battery to run the chip's circuitry, but may communicate by drawing power from the RFID reader. Some embodiments in accordance with techniques herein may use, for example, active and semi-passive tags in accordance with expected distances between RFID tags and readers.

The RFID tags do not need to be within the line of sight of the RFID reader. RFID tags that may be used with techniques herein may be, for example, read-write, read-only or "write once, read many" (WORM). With read-write RFID tags, information may be added to the tag or, in other words, information may be written and/or rewritten to the tag when the tag is within range of a reader. Read-write tags may have a serial number that can't be written over. Additional blocks of data stored in a memory of the tag may be used to store additional information about the item to which the tag is attached. Read-only RFID tags may have information stored on them during the manufacturing process whereby such information on cannot be modified, WORM tags may have a serial number written to them once, and that information cannot be overwritten at a later point in time.

In accordance with techniques herein; each of the RFID tags 106a-d may transfer a coded identification number, or identifier, when queried by the RFID tag reader. Such an identification number encoded on a particular RFID tag may be unique to distinguish between the different RFID tags in the system. Thus, the identification number transmitted by the particular RFID tag may uniquely identify a particular data storage system including that particular RFID tag. Additionally, depending on the type of RFID tag used in an embodiment such as read-write tags, an RFID tag may be encoded with other data particular to the data storage system to which the RFID tag is attached. Such information may include, for example, information identifying the type of data storage system (e.g., vendor, model, etc.) or other physical characteristics of the data storage system, the current software version(s) (e.g. operating system, firmware for drivers, etc.), and any other desired information as described elsewhere herein. The RFID tag may include a memory used to store desired data such as may be stored in an encoded form depending on the size of the memory. In such systems using read-write tags, some information about the data storage systems besides the identification number of the tag may be stored in the tag's memory and updated as may be needed based on any changes to the data storage system. As will be described in more detail below, in other systems whereby the tags do not provide information about the data storage systems other than the tag identification number, such information may be obtained through alternative means from the data storage systems, one or more centralized or aggregated databases, and the like.

The management device 108 may include the RFID tag reader 108 or interrogator which reads signals of encoded information transmitted from the RFID tags. In some embodiments, the RFID tag reader functionality may be included or integrated into components of the management device 104. Alternatively, in some embodiments, the RFID tag reader functionality may otherwise be included in a separate add-on device which may be physically connected to the management device or otherwise communicates electronically with the management device. For example, the RFID tag reader may be a separate device which connects and communicates to the management device such as using Bluetooth. The RFID tag reader as a separate device may communicate with the RFID tags on the data storage systems and obtain data therefrom. The RFID tag reader may then provide such information to a processor of the management device for further processing in accordance with techniques herein, such as for sorting or ranking, filtering, and then for viewing by an administrator on a display of the management device. In operation, the management device may issue instructions to control operation of the RFID reader and to provide information encoded in signals received from the RFID tags to the management device for processing. Generally, the communications between the various devices may use any suitable frequency, protocol and other means to facilitate communication and obtain information for use with techniques herein.

Distance between an RFID reader and each of the RFID tags may be determined using any suitable technique. Additionally, the particular technique(s) utilized may vary with one or more factors such as the particular environment and associate level of backscatter, desired accuracy, RF frequency band used for communications (e.g., UHF, UWB (ultra wide band)), and the like. The maximum detectable distance limits may vary with the particular tag, reader, RF frequency band, particular environment in which utilized, and the like. Distance between tags and a reader may be determined, for example, using received signal strength indication (RSSI) techniques and/or techniques based on time-based measurements. RSSI techniques involve measuring the signal strength of the arriving radio signal at the receiver. Knowing the power at which the signal was transmitted from the transmitter, the propagation characteristics of that particular radio signal in air and with some a priori knowledge of the environment it is possible to calculate approximately where the transmission originated based on how attenuated the signal is at the receiver. Time-based measurement techniques are based on the amount of time it takes the radio signal to travel between transmitter and receiver and distances may be measured using one or more of a variety of different techniques. For example, time-based techniques known in the art include time of flight (TOF), time of difference of arrival (TODA) and angle of arrival. The foregoing may all be referred to as time-based schemes because they are all based on the measurement of the propagation time of a radio signal from one location to another or the difference in arrival time of a radio signal at different locations. Distance may also be determined using other known techniques such as, for example, determining distance by looking at the relative phasing of the tag's backscatter as frequency is shifted while the required frequency hopping is taking place. In this instance, phasing means the relationship in reflected signal to the transmitted signal. The relative phasing of the tag's returned signal at a number of different frequencies may provide information about the distance to a non-moving tag. For example, techniques described in U.S. Pat. No. 7,119,738, Oct. 10, 2006, to Bridgelall et al., OBJECT LOCATION SYSTEM AND METHOD USING RFID, which is incorporated by reference herein, for determining distance between an RFID tag and reader may be used in an embodiment in accordance with techniques herein. Other exemplary systems and techniques known in the art that may be used in an embodiment using techniques described herein are described, for example, in U.S. Pat. No. 6,150,921, Nov. 21, 2000, ARTICLE TRACKING SYSTEM, to Werb et al., U.S. Pat. No. 6,456,239, Sep. 24, 2002, METHOD AND APPARATUS FOR LOCATING MOBILE TAGS, to Werb et al., and U.S. Pat. No. 6,812,824, Nov. 2, 2004, METHOD AND APPARATUS COMBINING A TRACKING SYSTEM AND A WIRELESS COMMUNICATION SYSTEM, to Goldinger, et al., all of which are incorporated by reference herein.

It should be noted that the number of data storage systems included in the list may also be configurable and included as part of the filtering criteria. For example, the filtering criteria may also specify to include up to a maximum number of systems in the list. Additionally, the filtering criteria may indicate criteria used to sort or rank data storage systems meeting the distance criteria whereby the data storage systems may be listed in an ordering based on the sorted or ranked order. The list may be sorted or ranked based on increasing or decreasing distance between the management device and data storage system for all such data storage systems meeting the distance criteria. For example, the filtering criteria may indicate to list those data storage systems less than 100 feet from the management device 104, to sort the systems in the list based on increasing distance between the data storage system and management device, and include a maximum number of 5 systems in the list displayed on the management device. Such filtering criteria may be specified using any suitable means such as a user interface (UI) which saves the filtering criteria as current settings. To further illustrate, the foregoing filtering criteria may be specified and/or configurable using any suitable technique such as a graphical UI including menus and user input fields. In this particular example using the foregoing filtering criteria, consider the case that the data storage systems 102c and 102d may be located less than 100 feet from management device 104 and the data storage systems 102a and 102b may be located more than 100 feet from the management device 104. Additionally, data storage system 102d may be 50 feet from the device 104 and the data storage system 102c may be 40 feet from the device 104 so the list displayed on the device 104 may list data storage system 102c first followed by data storage system 102d. The list may also include any desired information about each such system. Such information may include, for example, an identifier, name, or serial number of the data storage system and its approximated distance as may be determined using any suitable technique some of which are mentioned herein.

As described above, the filtering criteria may be related to distance or proximity between management device and data storage system and is one type of information that may be specified for the filtering criteria. More generally, the above-mentioned distance or proximity threshold may be specified as filtering criteria alone, or in combination with, other filtering criteria.

As an example use case using distance or proximity, the data storage system manager or administrator (with device 104) may stand near an entrance to the laboratory or room including systems 102*a-d* and may want, for example, a list of all data storage systems which are more than a threshold distance away. The list may be ranked or sorted in terms of decreasing estimated distance. The manager may have a maintenance or other work schedule for when particular work is to be performed on the different data storage systems. If the data storage system is scheduled to have upcoming maintenance performed (e.g., such as within an upcoming or future window of time) and the data storage system is identified as being more than the threshold distance away using the techniques herein, the data storage system manager may decide to relocate the system closer to the entrance to the room or laboratory to facilitate performing the scheduled maintenance.

It should be noted that the filtering criteria and code for communicating with the data storage systems, obtaining information from one or more database(s) (e.g., as described below) and the like, may be stored locally on the management device.

As another example, filtering criteria may include one or more metrics and associated thresholds denoting a level of utilization of the data storage systems. A system manager or administrator of a data storage system may want to identify those data storage systems having a threshold level of CPU usage or utilization. For example the administrator may want to identify data storage systems which are idle or underutilized (e.g., under a threshold level of usage), and/or those which are overutilized or over a threshold level of usage. For example, those systems which are underutilized may be candidates for movement to another laboratory or location since they are not being utilized in the current configuration. As another example, if all data storage systems in the laboratory are overutilized or above a threshold level, it may indicate that additional data storage systems should be added to the current configuration in the laboratory. The utilization may be measured in terms of CPU usage such as percentage of utilization of the data storage system's main CPU processor(s) (e.g., CPU utilization). The filtering criteria used to selectively display a list of data storage systems on a management device may include a value for utilization expressed, for example, in terms of percentage of CPU utilization, a measure of utilization of a particular component or one or more types of component (e.g., DAs, FAs, cache, CPU), and the like). For example, with respect to CPU utilization, a user may specify a value, such as 90%, used as a threshold to identify data storage systems which are overutilized or "hot" whereby a data storage system having CPU utilization above the 90% threshold may be considered overutilized. In a similar manner, a user may specify a value, such as 10%, used as a threshold to identify data storage systems which are underutilized or "cold" whereby a data storage system having a CPU utilization less than the 10% threshold may be considered cold or underutilized. Such data storage systems which are underutilized may be, for example, taken offline/out of use, moved to another location or configuration where expected utilization is greater, and the like as part of data storage system management.

With reference back to FIG. 1, a data storage system may, at various times, report information to any one or more devices including the management software, such as to the management system 16. Such information reported may include information regarding the health and activity of the different physical and logical components of the data storage system. For example, a data storage system may report various metrics such as CPU utilization and others described herein to the management system 16. The management system 16 may store and collect such information from multiple data storage systems into a database such as illustrated in FIG. 4 whereby the database may be used in connection with techniques herein.

Figure 4:
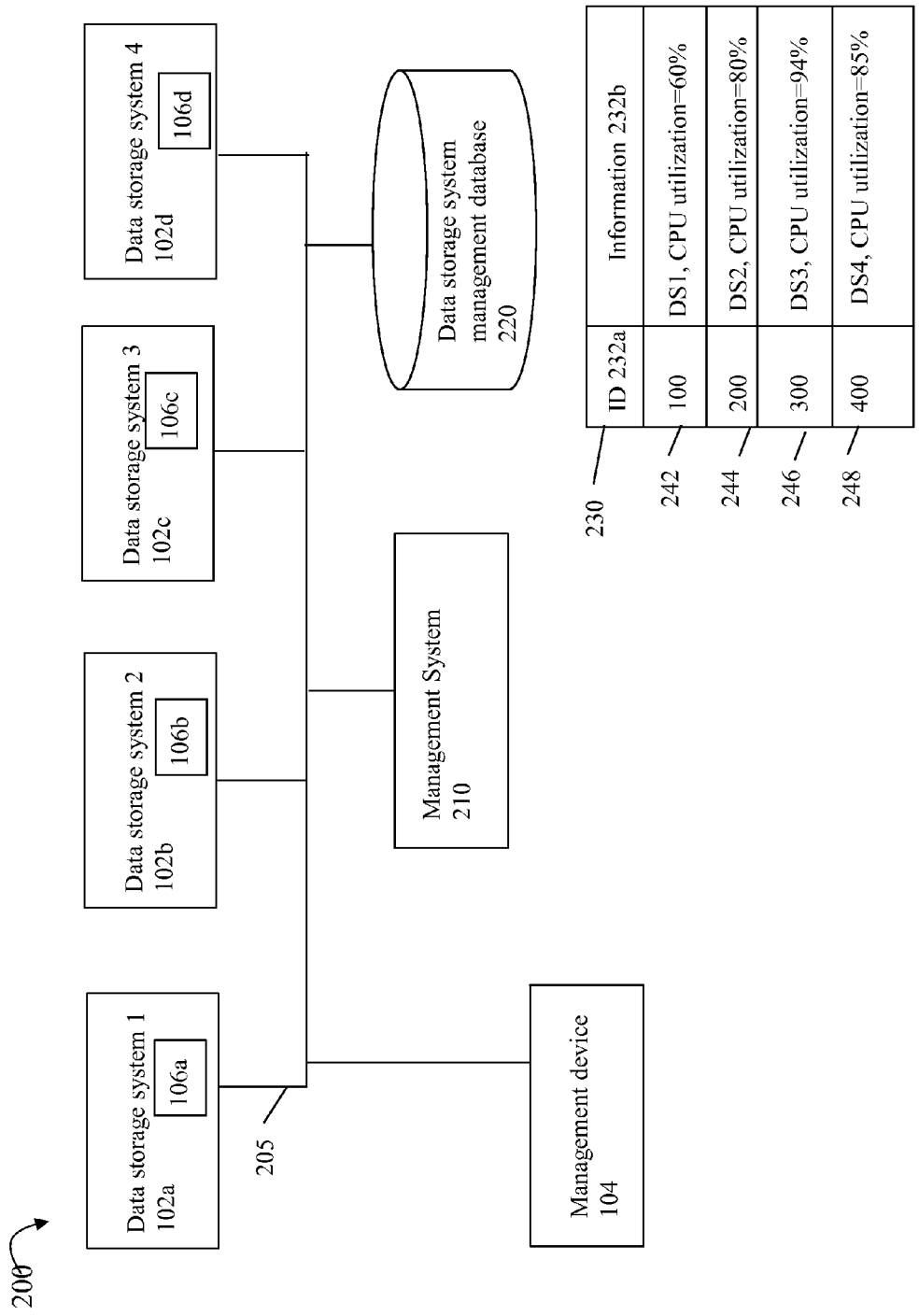
FIGS. 4 and 5 are examples of components that may be included in an embodiment in accordance with techniques herein.

With reference now to FIG. 4, shown is an example of the data storage systems 102*a-d* which may be connected to a management system 210 (similar to the management system 16 of FIG. 1). Data, such as the CPU utilization and other metrics, reported from the systems 102*a-d* to the management system 210 may be stored in a centralized data storage system management database 220. In accordance with techniques herein, the management device 104 may acquire the unique identifier (also referred to as identification number) transmitted by an RFID tag and may further use the unique identifier as an index into the database to access additional desired information on each of the data storage systems. In this manner, information about the data storage systems may be acquired from the RFID tags alone or optionally in combination with information from the database 220.

Element 230 is an example of information that may be stored in a table or other structure of the database 220. Element 230 includes a first column 232*a* of identifiers or IDs and a second column of information 232*b* associated with the particular manner. Each row in 230 may be indexed by a particular unique ID associated with a different one of the data storage systems 102*a-d* whereby the unique ID associated with one of the data storage systems may be that ID as transmitted by the RFID tag of the data storage system as described herein. For example, row 242 may include associated information for data storage system 102*a* having RFID tag 106*a* that transmits ID 100 whereby the information includes a current CPU utilization of 60% and indicates that the system has other identifying information such as a serial number or name of "DS1". Row 244 may include associated information for data storage system 102*b* having RFID tag 106*b* that transmits ID 200 whereby the information includes a current CPU utilization of 80% and indicates that the system has other identifying information such as a serial number or name of "DS2". Row 246 may include associated information for data storage system 102*c* having RFID tag 106*c* that transmits ID 300 whereby the information includes a current CPU utilization of 94% and indicates that the system has other identifying information such as a serial number or name of "DS3". Row 248 may include associated information for data storage system 102*d* having RFID tag 106*d* that transmits ID 400 whereby the information includes a current CPU utilization of 85% and indicates that the system has other identifying information such as a serial number or name of "DS4".

In operation, the data storage systems 102*a-d* may periodically provide the management system 210 with current values for collected metrics such as regarding the activity and health of different components and the system 210 may store such information in the database 220. The information collected may include the CPU utilization which is stored in the database 220 such as illustrated by element 230. Additionally, the database 220 may include other information such as related to the configuration of physical and logical entities of the data storage systems. At various times such as described in connection with FIG. 3, the management device 104 including the RFID reader functionality may communicate with the RFID tags on data storage systems 102*a-d* and obtain the unique ID transmitted by each of the RFID tags whereby each such unique ID transmitted by a tag on a particular data storage system serves to uniquely identify that particular data storage system. The management device 104 may connect to the network 205 over a connection (wireless or otherwise) and then use the acquired unique IDs from the RFID tags to obtain additional information form the database 220 regarding the data storage systems. For example, the management device 104 may acquire the IDs 100, 200, 300 and 400 via communication between the RFID reader of the device 104 and the RFID tags 106*a-d* of the data storage systems 102*a-d*. The management device 104 may also perform processing to determine an approximate distance measurement between the reader of the management device 104 and each of the RFID tags 106*a-d*. For those data storage systems within a specified threshold distance such as data storage systems 102*c* and 102*d* as described above, the management device 104 may connect over network 205 to the database 220 including the information 232*b* for each of the desired data storage systems 102*c-d* having, respectively, IDs=300 and 400. In this case, the information associated with entries 246 and 248 may be returned to the management device 104. The management device may further process the returned information based on any additional filtering criteria. For example, filtering criteria may be specified to display a list of data storage systems within 100 feet (as described in FIG. 3) and which also have a CPU utilization more than 80% and to display the list of data storage system in increasing order of CPU utilization. The displayed information may include the CPU utilization as read from the database. Continuing with this example, the displayed list may be:

Data storage system DS4 CPU utilization 85%
Data storage system DS3 CPU utilization 94%

To generalize that described above, the filtered list may be displayed in accordance with criteria such as to sort or rank the list of data storage systems based on one or more different attributes of the data storage systems. For example, the filtering criteria may include a minimum distance and a level of utilization, such as underutilization or overutilization described above. Based on such filtering criteria, a list of one or more data storage systems may be determined for display on the management device. Prior to display, the list may be further sorted or ranked, such as based on criteria to display the data storage systems in an order based on increasing or decreasing utilization, criteria to display the data storage systems in an order based on increasing or decreasing distance between the data storage system and the management device/user, and the like.

As described herein, the management device 104 may acquire additional information from the RFID tags besides the unique ID as may be optionally encoded in the RFID tags depending on the embodiment. In this case, such additional information may also be included in the displayed information and/or used in connection with further filtering the list of data storage systems to be displayed. Filtering criteria may be specified for any information acquired from the RFID tags and/or database 220.

It should also be generally noted that information may be obtained from one or more other databases besides the database 220 depending on the particular embodiment, filtering criteria, and uses of techniques herein. Additionally, and more generally, any information described herein as being stored in a database or otherwise obtained from one or more of the data storage systems may also be stored on the RFID tags depending on the particular RFID tag storage capabilities, whether the RFID tag may be written and/or rewritten to, and the like.

Figure 5:
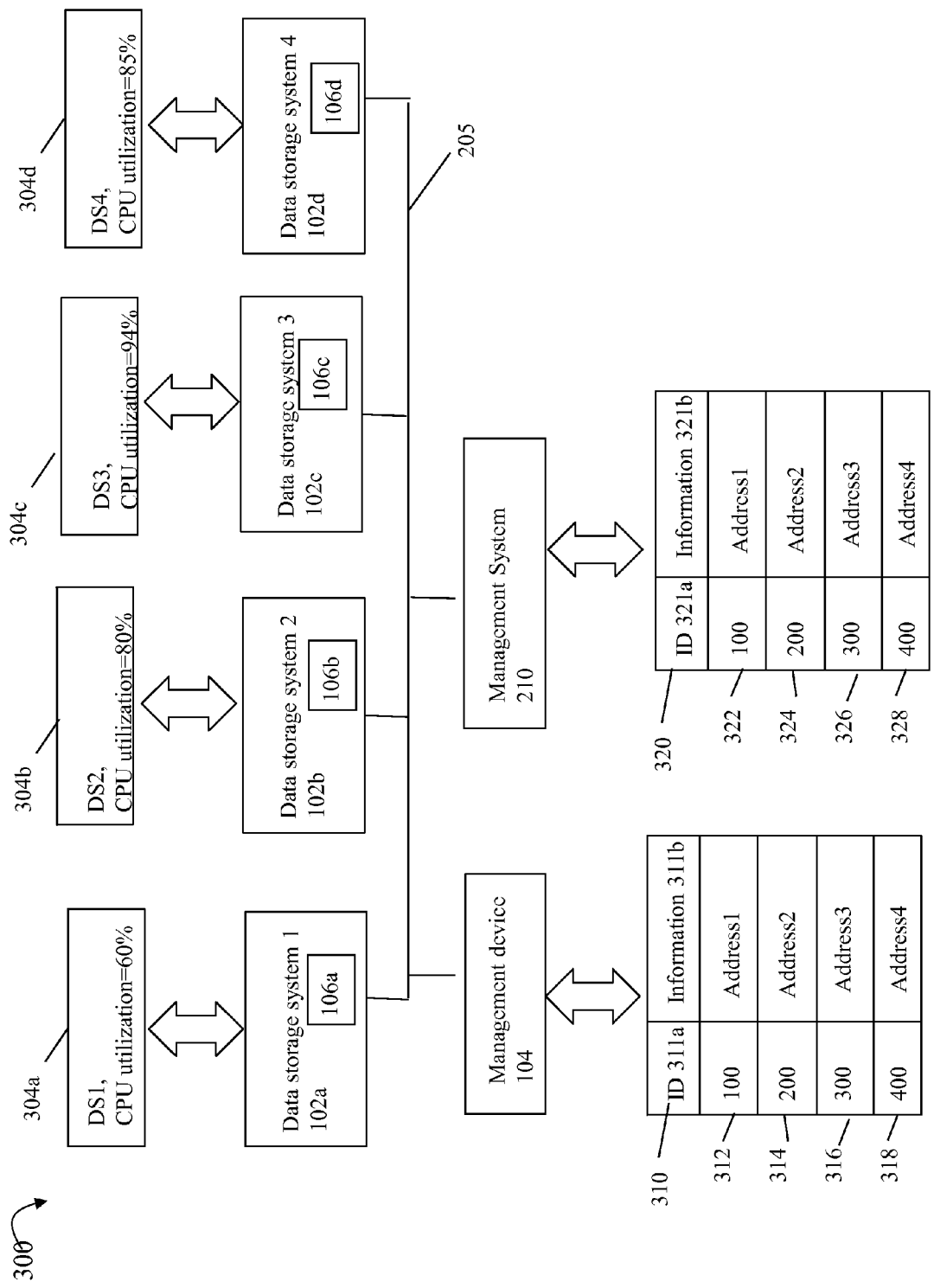

Referring to FIG. 5, shown is an example of a variation of the embodiment of FIG. 4 that may be used in accordance with techniques herein. The example 300 includes elements similar to those of FIG. 4 as described above with the difference that there may be no centralized database used to store information about the data systems 102*a-d*. Alternatively, each of the data storage systems 102*a-d* may store its own information regarding its configuration, health, and the like, respectively, in local databases 304*a*-304*d*. In other words, with reference back to FIG. 4, information relevant to each of the data storage systems included in the database 220 may be alternatively stored locally at each data storage system. It should be noted that the use of a database as described herein, such as in connection with element 220 of FIG. 4 or elements 304*a-d* of FIG. 5 may be, more generally, any suitable data container (e.g., file, memory or other container that may be available and may vary with an embodiment).

In the embodiment of FIG. 5, each of the management devices or systems 104 and 210 may include information stored locally regarding each unique ID as transmitted by each data storage system's RFID tag. For example, as described above, IDs 100, 200, 300 and 400 are transmitted, respectively, by RFID tags 106*a-d* of data storage systems 102*a-d*. Management device 104 may include a table 310 of information which maps each such unique ID 311*a* to information 311*b* associated with a particular data storage system. The information in 311*b* may be used to identify and/or facilitate communications with the particular data storage system having an RFID tag which transmitted a particular ID. Element 312 indicates that ID 100 is generated by the RFID tag of data storage system 1 (DS1) 102*a* having address1. The address1 may be, for example, an internet (e.g., IP) address at which the management device 104 may communicate with the system 102*a* to obtain additional information as may be stored in the system 102*a*'s local database 304*a*. For example, the management device may make one or more API (application programming interface) calls to the data storage system 102*a* using address1 to obtain such additional information from system 102*a*.

Element 314 indicates that ID 200 is generated by the RFID tag of data storage system 2 (DS2) 102*b* having address2. The address2 may be, for example, an IP address at which the management device 104 may communicate with the system 102*b* to obtain additional information as may be stored in the system 102*b*'s local database 304*b*. Element 316 indicates that ID 300 is generated by the RFID tag of data storage system 3 (DS3) 102*c* having address3. The address3 may be, for example, an IP address at which the management device 104 may communicate with the system 102*c* to obtain additional information as may be stored in the system 102*c*'s local database 304*c*. Element 318 indicates that ID 400 is generated by the RFID tag of data storage system 4 (DS4) 102*bd* having address4. The address4 may be, for example, an IP address at which the management device 104 may communicate with the system 102*d* to obtain additional information as may be stored in the system 102*d*'s local database 304*d*. Other management devices or systems such as management system 210 may also include a set of information 320 which is similar to that as described for the table 310.

What will now be described are some examples of additional filtering criteria and additional information that may be stored regarding the data storage systems for use in connection with techniques herein.

Filtering criteria may also include criteria related to power sources used for the different data storage systems. Power sources may include primary power sources as well as backup or secondary power sources used upon failure of a primary source of power. Sources of power may also relate to information regarding an electrical grid supplying primary power to the data storage systems. An electrical grid may be generally characterized as an interconnected network for delivering electricity from suppliers to consumers. It consists of power generating stations that produce electrical power, high-voltage transmission lines that carry power from distant sources to demand centers, and distribution lines that connect individual customers. Power generating stations may be located near a fuel source, at a dam site, or to take advantage of renewable energy sources, and may be located away from heavily populated areas. The electric power which is generated by such stations may be stepped up to a higher voltage-at which it connects to the transmission network. The transmission network may move the power long distances, sometimes across international boundaries, until it reaches its wholesale customer, such as the company that owns a local distribution network. On arrival at a substation such as of the local distribution network, the power may be stepped down from a transmission level voltage to a distribution level voltage. As it exits the substation, it enters the distribution wiring. Finally, upon arrival at the service location for use by a consumer, the power is stepped down again from the distribution voltage to the required service voltage(s). In connection with the foregoing, configuration information regarding the power source for data storage systems may be included in a database to identify, for example, which data storage systems may have a common aspect of power sources. For example, power source information for a data storage system (as may be stored in a database as described in connection with FIGS. 4 and 5) may identify one or more backup or secondary power sources (e.g., which generators, batteries, etc. provide backup power), may identify the particular substation, set of transmission lines, etc. used to provide a primary source of power, and the like. In this manner, common and different aspects of providing power to different data storage systems may be identified and such information may be used for data storage management purposes. For example, information for each data storage system that may be stored in a database may identify the generator or other particular source of backup power, the particular substation, and/or local distribution company providing the primary power, particular wiring such as within a physical location or site used to distribute power to the data storage systems, and the like. This information may be used by the data storage system management in determining power source dependencies of different data storage systems to assess what systems may be affected in the event of a power failure. For example, let data storage systems 102a-d be located physically in the same room or laboratory in a site. Systems 102a may be used to store backup data of system 102b, the primary system and the configuration information may indicate that the same backup power source (e.g., generator) is used to provide power for 102a and 102b. It may be desirable to have a primary system 102b use a different backup power source than the data storage system 102a providing the primary system's backup data. As such, filtering criteria may be specified which requests to identify sets of two or more data storage systems having a common backup power source and/or common aspects or dependencies related to primary power source. For example, two data storage systems 102a-b in the same laboratory may be used to provide data storage services to the same set of hosts or servers. It may be desirable to determine whether the two systems 102a-b use a same set of wiring within a physical site to deliver power. In this manner, both data storage systems 102a-b would be unavailable in the event of a failure to such wiring. It may be desirable to relocate one of these systems to use a different set of wiring. More generally, the one or more databases used in connection with techniques herein may include information regarding power provided to the data storage systems to determine common or dependency aspects between such systems. Such information may be used by a system manager to identify dependencies between data storage systems and remove such dependencies when suitable such as to avoid multiple simultaneous data storage system failures should a common component or aspect in providing power experience error, failure or disaster.

The filtering criteria and information such as may be stored in a database for use with techniques may also include one or more other metrics used in assessing system health of the data storage systems. For example, information may be collected in one or more of the databases (e.g. the database 220 of FIG. 4 or other databases 304a-d of FIG. 5) for the data storage systems for one or more metrics regarding component failures and/or errors (e.g., failures and/or errors and/or usage regarding physical drives, DAs, FAs, cache, fans, memory, and the like) as may be included in, or used by, each of the data storage systems. Accordingly, the filtering criteria may specify to identify, for example, data storage systems having any physical drive failures within a specified period of time or date range, identifying data storage systems having more than a threshold number of such physical failures within a specified time period, which data storage systems have above or below a threshold level of unused or available storage capacity, and the like.

The filtering criteria and information about the data storage systems may generally include any type of data storage configuration information regarding the arrangement or physical location of the data storage systems, the use of the particular data storage systems, different attributes or characteristics regarding components of the systems, logical configuration entities (e.g. RAID groups formed from physical devices), and the like. For example, the information about the data storage systems may identify the number of physical devices in each data storage system, attributes or properties regarding each such physical device (e.g., technology type as flash or solid state, SATA rotating disk drive, FC rotating disk drive, physical drive speed, expected performance aspects, drive vendor, drive storage capacity), information regarding logical device configuration (e.g. which LUNs are configured on which physical devices), RAID group configuration (e.g., which physical drives of a system are included in a particular RAID group, information regarding the particular RAID group such as the RAID level (e.g., RAID-1, RAID-5, RAID-6 and the like)). In this manner, the filtering criteria may be used to identify one or more data storage systems which meet or do not meet specified filtering criteria based on any one or more of the foregoing data storage configuration information. For example, the filtering criteria may specify to identify which data storage systems have physical devices with one or more particular attributes (e.g., particular drive type such as solid state, flash, SATA rotating disk drives, FC rotating disk drives, drives by a particular vendor, and the like), which data storage systems have physical drives configured in a particular RAID group or level (e.g., RAID-1, RAID-5, RAID-6), and the like.

The information about the data storage systems that may be used in connection with techniques herein may identify various attributes related to disaster recovery such as regarding data replication and data backup. For example, the information stored per data storage system may identify whether the data storage system provides backup storage or contains a replicate copy of data for any other data storage system and/or may identify the target location used to store backup data for the data storage system. To further illustrate, system 102c may be a primary system having its data replicated or backed up to system 102d. Information for system 102d stored in the database 220 (or otherwise 304d of FIG. 5) may identify that it provides or holds the backup data for system 102c. Information stored in a database (e.g., 220 of FIG. 4 of 304c of FIG. 5) for system 102c may identify complementary information denoting that system 102d is the target for storing backup data of system 102c. The filtering criteria may request to identify which of the systems 102a-d in the laboratory have their backup data also stored on one of these same data storage systems. In such cases, it may be desirable to relocate the system providing the backup data to a different laboratory (e.g., different room within the same physical site or perhaps even different physical geographical sites) because in the event of disaster in the laboratory, both the systems 102c and 102d are likely to experience data failure. As another example, the filtering criteria may request to identify which of the systems 102a-d within the predetermined distance (e.g., within 100 or 1000 feet) have their backup data also stored on one of these same data storage systems. In such cases, it may be desirable to relocate the system providing the backup data to another location within the same laboratory (e.g., room), different laboratory in the same physical site, or even different physical geographical sites, because in the event of disaster in the laboratory, both the systems 102c and 102d are likely to experience data failure.

As another example, information about the data storage systems, such as may be stored in the database(s) for systems 102a-c or stored and obtained using other suitable means, may indicate that all three of these systems have their backup data stored at one or more data storage systems all in the same physical site or geographic location. Filtering criteria may request to identify which of the systems within a predetermined distance have their backup data stored on the same target data storage system, stored on any data storage system at the same physical site or geographic location, and the like. In such cases, it may be desirable to reconfigure the backup for the systems to be in different target data storage systems in different physical locations or sites. For example, systems 102a-c may provide storage services for a data center in Massachusetts and all such systems 102a-c may have their data backed up to one or more other data storage systems located in another data center in New York. It may be desirable to reconfigure the backup data for the systems 102a-c to be in different target data storage systems in different physical locations or sites. Such reconfiguration may be desirable so that all systems 102a-c do not lose their backup data should a disaster occur at the New York data center causing data failure and unavailability. Also, upon occurrence of a disaster at the Massachusetts data center causing systems 102a-c to be unavailable, computer systems may access the backed up data all of which is located only at the New York data center and such access may overload the New York data center. As an example of possible reconfiguration, system 102a may continue to have its backup data stored in New York as currently configured. However, replication or data backups for systems 102b-c may be modified so that, for example, system 102b has its backup data stored at a data center in Ohio and system 102c has its backup data stored at a data center in Illinois.

Thus, generally, as described above, techniques herein may be used to identify data storage systems which are located within a particular distance from the management device and which also have a common replication or backup target location. In such cases, it may be desirable to reconfigure the backup target location of such systems to be different. Techniques herein may also be used to identify a set of data storage systems which are located within a particular distance from the management device and then identify any systems of the set which also have their backup data stored at a target system which is also included in the same set (e.g., systems 102a-102d may be located within N feet of the management device and system 102a may have its backup data stored on system 102d). In such cases, it may be desirable to reconfigure the location of the backed up data to another system outside of the set (e.g., in another laboratory, another location within the laboratory located further away from the primary system being backed up, at another physical site, and the like).

An embodiment in accordance with techniques herein may determine a list of one or more data storage systems meeting specified filtering criteria as described above. Information about the data storage systems which may be used in connection with the filtering criteria to determine whether to include the data storage system in the filtered list may be obtained, for example, from one or more databases, by communicating directly with the data storage system(s), and the like. For each data storage system included in the filtered list, generally any information about the system may be displayed. For example, with reference back to FIG. 3, the filtering criteria may indicate to display a list of data storage systems in accordance with a specified distance threshold between the system and the management device. For each such data storage system, the approximate or estimated distance may be displayed along with possibly other information as described herein such as, for example, information identifying the data storage system (e.g., data storage system serial number, IP address, vendor, type or model of data storage system, and the like).

In one embodiment, the filtering criteria may be predefined so that the user with the management device 104 may simply walk through a laboratory and a filtered list of data storage systems in accordance with the filtering criteria is automatically displayed without having the user manually enter the filtering criteria.

Figure 6:
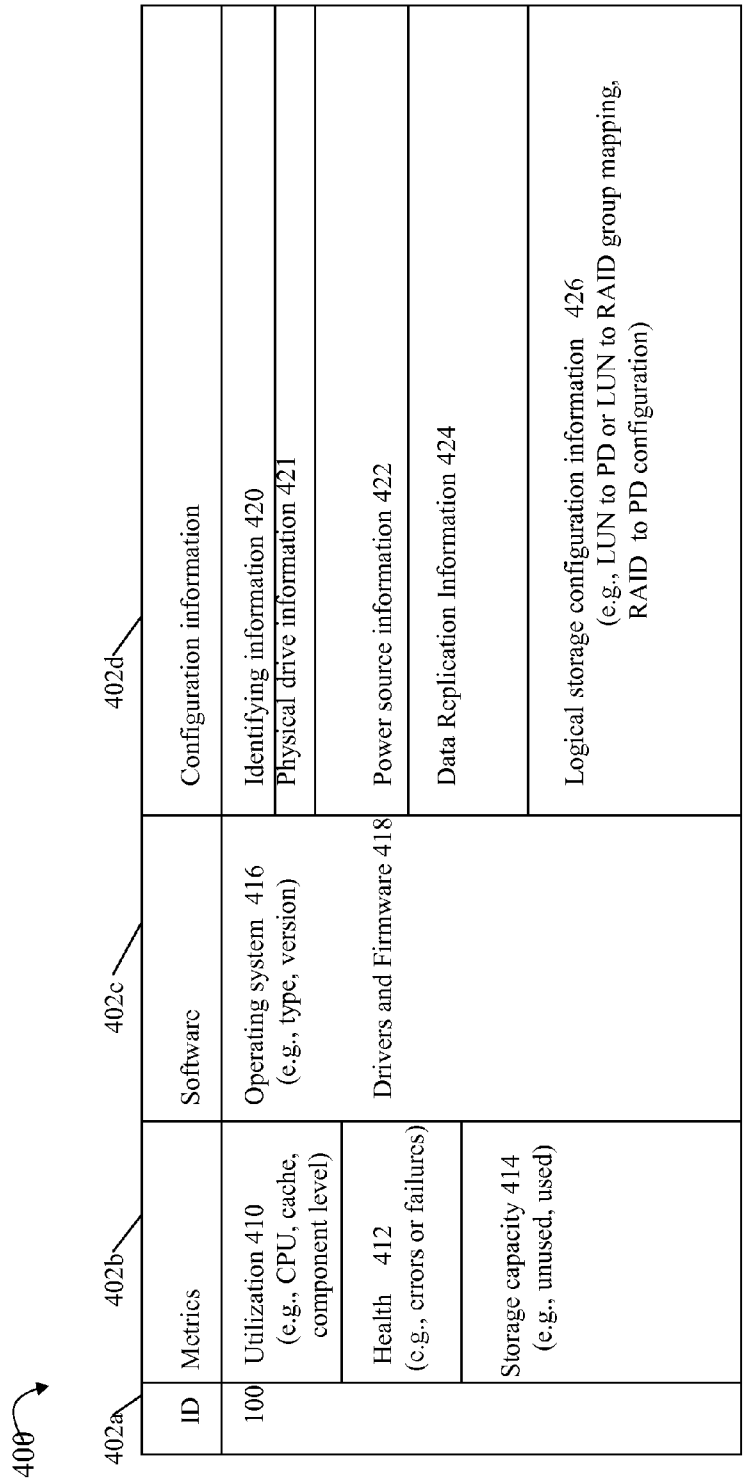
FIG. 6 is an example of information about a data storage system that may be used in connection with techniques herein.

Referring to FIG. 6, shown is an example 400 of information that may be available for each data storage system. The information in 400 may be obtained from one or more sources such as, for example, by communicating with the data storage system and obtaining information available locally on the data storage system and/or obtaining information from one or more other locations such as from a central database such as 220 of FIG. 4. The filtering criteria that may be used may specify distance criteria as described elsewhere herein and optionally one or more other criteria that may be determined using any other information available about a data storage system such as illustrated in FIG.

6. Additionally, the information displayed for each data storage system in the list filtered in accordance with the filtering criteria may include any of the information of the example 400 and also a distance between the data storage system and RFID reader of the management device 104.

The example 400 includes four columns of information including an ID 402*a*, metrics 402*b*, software 402*c* and configuration information 402*d*. The ID 402*a* may be the ID uniquely associated with a single data storage system as transmitted by an RFID tag of the data storage system. The metrics 402*b* may relate to utilization aspects 410 of the data storage system such as, for example, CPU utilization, cache usage, component level utilization such as for DAs, FAs, disks or storage devices, and the like. The metrics 402*b* may relate to the health 412 of the data storage system such as, for example, a number of errors or failures of physical hardware components (e.g., physical devices or drives, fans, etc.) that may be determined for a particular time period. The metrics 402*b* may relate to the storage capacity 414 of the physical devices included in the data storage system such as, for example, an amount of used or unused storage capacity, total storage capacity, and the like. The software 402*c* may relate to the particular operating system (e.g., LINUX, a Windows-based operation system)) running on the data storage system, a version number of the operating system, and other information regarding the operating system. The software 402*c* may also relate to the particular software version, for example, of the various drivers, and/or firmware 418 of the data storage system.

The configuration information 402*d* may relate to identifying information 420 of the data storage system such as, for example, the data storage system's name, serial number, IP address, and the like. The configuration information 402*d* may relate to physical device information 421 such as, for example, the number of physical drives in the system, characteristics or attributes of each such drive, and the like. The configuration information 402*d* may relate to power source information 422 for the data storage system such as, for example, identifying a backup or secondary power source, identifying information regarding the primary power source and configuration, and the like. The configuration information 402*d* may include data replication information 424 such as, for example, regarding whether data backup or replication is performed for the data storage system, identifying the target location or target data storage system used to store any copies or backups of data of this data storage system, identifying another source data storage system which uses this data storage system as its target for data replication or backup, and the like. The configuration information 402*d* may relate to logical storage configuration information 426 such as, for example, which LUNs have storage provisioned from physical devices of the system, which physical devices of the system are included in configured RAID groups, and the like.

Figure 7:
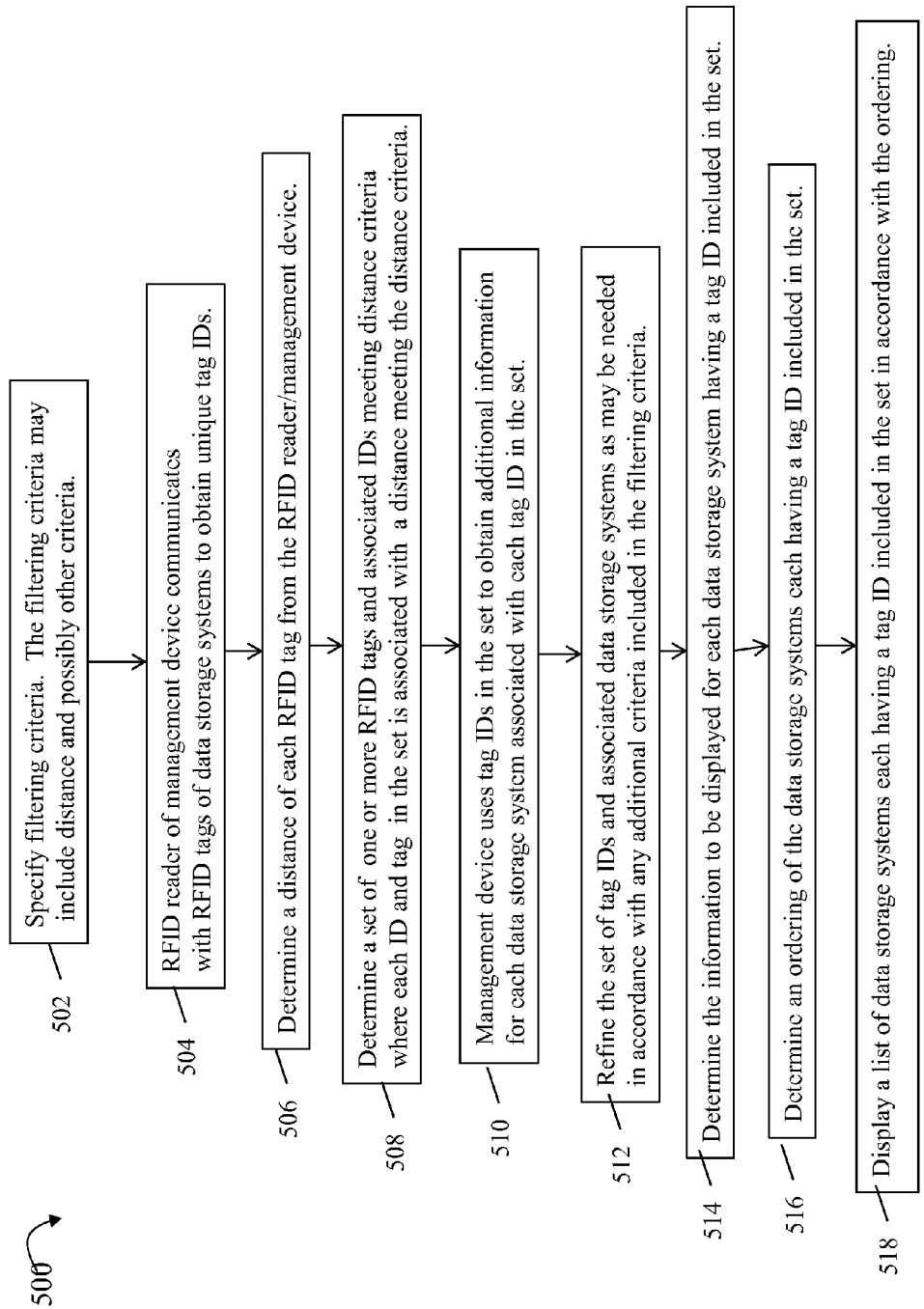
FIG. 7 is a flowchart of processing steps that may be performed in an embodiment in accordance with techniques herein.

Referring to FIG. 7, shown is a flowchart of processing steps that may be performed in an embodiment in accordance with techniques herein. The flowchart 500 summarizes processing described above. In step 500, filtering criteria may be specified. The filtering criteria may include distance criteria and possibly other criteria as described herein. At step 504, the RFID reader of the management device communicates with the RFID tags of the data storage systems to obtain the unique tag IDs. At step 506, a distance from the RFID reader/management device is determined for each RFID tag transmitting a particular ID. As described herein, the distance may be determined using any suitable technique known in the art such as based one or more signals transmitted from the RFID tag. At step 508, a set of one or more RFID tags and associated IDs meeting the distance criteria is determined whereby each ID in the set is associated with a distance meeting the distance criteria. Since a particular RFID tag transmits a particular ID and the tag is included on or associated with only one of the data storage systems, the distance determined for a particular RFID tag may be used as the distance between the RFID reader and the data storage system including the particular RFID tag.

At step 510, the management device uses the tag IDs in the set to obtain additional information for each data storage system associated with a tag in the set. At step 512, the set of tags and IDs (and data storage systems including such tags of the set) may be refined as needed in accordance with any additional criteria included in the filtering criteria. In step 514, the information to be displayed is determined for each data storage system having a tag ID included in the set. At step 516, any desired ordering or ranking of the data storage systems may be determined where each such data storage system has a tag ID included in the set. At step 518, a list of data storage systems each having a tag ID included in the set is displayed in accordance with the ordering determined in step 516. The list in step 518 may be displayed, for example, on a screen of the management device.

Figure 8:
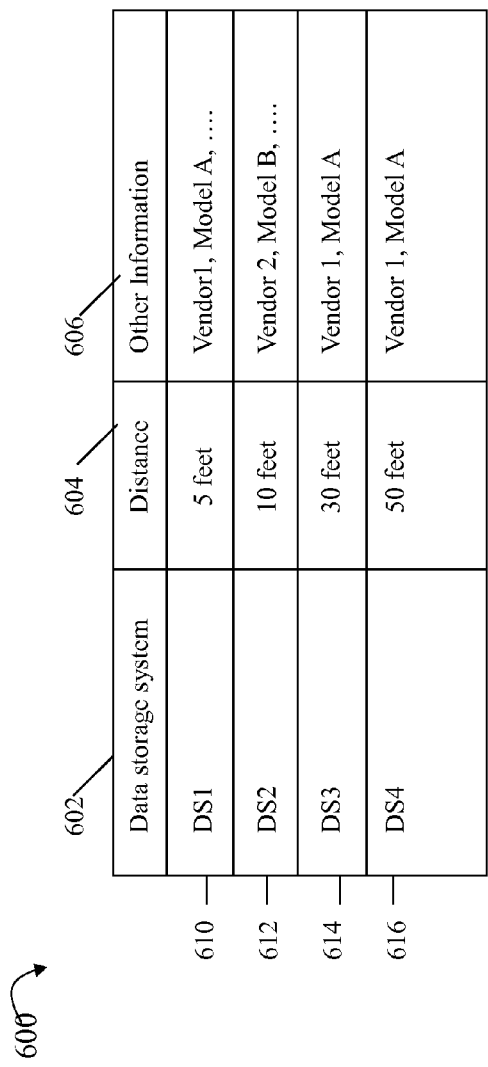
FIG. 8 is an example of information that may be displayed on a management device in connection with techniques herein.

Referring to FIG. 8, shown is an example of information that may be included in a list displayed in accordance with processing of FIG. 7. For example, assume there are 4 data storage systems as described in connection with FIG. 3 and the filtering criteria is to display information for data storage systems which are less than 60 feet from the management device including the tag reader. Additionally, the list of data storage systems is to be ranked or sorted based in increasing distance. The information displayed for each system in the list may include a name or serial number identifying the system in column 602, a distance 604 denoting the distance between the system and the management device/RFID reader, and other information 606 such as related to the vendor and model of the particular data storage system. Element 610 indicates that data storage system DS1 is 5 feet from the management device/RFID reader and is a data storage array by Vendor 1, Model A. Similarly, rows 612, 614 and 616 include other information for remaining data storage systems meeting the filtering criteria of distance which is less than 60 feet from the management device.

It should be noted that although particular implementations, such as using RFID tags and a tag reader, have been described in the embodiment herein, more generally, techniques herein may be used in connection with an embodiment which provides for transmitting signals by and between the management device and/or data storage systems using any suitable means and at any suitable frequency which may include those of the RF spectrum as well as outside of the RF spectrum, such as of the infrared (IR) band using, for example, IR tags.

An embodiment in accordance with techniques herein may determine distances between the management device and data storage systems using any suitable technique known in the art. Some such techniques are mentioned herein. Distances may be determined in real-time or in a dynamic manner using such techniques. An embodiment may also determine distances for use with techniques herein in other suitable ways. For example, a database such as described herein may include information on the data storage systems having the unique IDs such as may be transmitted by the RFID tags. The database may also include positional or distance information regarding where each of the data storage systems are located in the laboratory. For example, when a data storage system is moved or placed in a particular location with a laboratory, the information in the database may be updated to reflect this movement or placement of the system in its current position. For example, a laboratory may use a commercially available indoor positioning and object location system that includes at least three readers and a technique known in the art, such as triangulation, may be used to determine the location of each of the data storage systems as the RFID tag or other signal transmitting component of a data storage system communicates with each of the readers. An approximate location such as within the laboratory may be determined for each of the data storage systems and may be reported to a central location. In a similar manner, a location within the laboratory may be determined for the management device. For example, the management device may include an RFID tag in a manner similar to that as described herein for use with the data storage systems. In this manner, a relative distance between the management device and the data storage systems may be determined based on the estimated location of each in the laboratory as reported to the central location. These and other ways of estimating distances known in the art may be used with techniques herein.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium (also referred to as computer readable medium) having any one of a variety of different forms including volatile and nonvolatile, removable and non-removable media implemented in any method or technology for storage of information such as computer readable instructions, data structures, program modules or other data. Computer-readable storage media, or computer-readable medium, includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining a list of data storage systems comprising:
   receiving, at a management device, filtering criteria including a distance threshold, an associated distance condition denoting a distance with respect to the management device, and other criteria to identify any data storage system meeting the distance threshold and the associated distance condition and wherein said any data storage system has any of its data backup and data replication copy stored on another data storage system also meeting the distance threshold and the associated distance condition;
   determining a set of one or more data storage systems meeting the filtering criteria, wherein the set of one or more data storage systems includes at least one data storage array and wherein the filtering criteria indicate that the set determined includes data storage systems located within the distance threshold from the management device and wherein each data storage system of the set has any of its data backup and data replication copy stored on a target that is another data storage system of the set;
   displaying information regarding the set of data storage systems meeting the filtering criteria; and
   for each data storage system of the set, performing any of: reconfiguring the target to be a new target data storage system not included in the set, and physically relocating the target to a different physical location from said each data storage system.

2. The method of claim 1, wherein each data storage system of the set is included in a plurality of data storage systems, and wherein each of the plurality of data storage systems includes a radio frequency identification tag that transmits a unique identifier uniquely identifying said each data storage system to a tag reader.

3. The method of claim 2, wherein the tag reader is included as an integrated component of the management device or is otherwise in electronic communication with the management device.

4. The method of claim 3, further comprising:
   receiving, by the tag reader, a plurality of unique identifiers transmitted from a plurality of radio frequency identification tags, each of the plurality of radio frequency identification tags being included on a different one of the plurality of data storage systems and used to uniquely identify said different one of the plurality of data storage systems;
   determining a distance of each of the plurality of radio frequency identification tags from the tag reader whereby the distance is a distance between the tag reader and one of the data storage systems including said each radio frequency identification tag; and
   determining, in accordance with the filtering criteria, a first set of one or more of the plurality of unique identifiers each associated with one of the plurality of radio frequency identification tags.

5. The method of claim 4, wherein each data storage system included in the set of one or more data storage systems is uniquely identified by one of the unique identifiers included in the first set, and wherein a first of the plurality of radio frequency identification tags that transmits said one unique identifier is included in said each data storage system.

6. The method of claim 5, wherein said determining, in accordance with the filtering criteria, the first set of one or more of the plurality of unique identifiers each associated with one of the plurality of radio frequency identification tags includes:
   determining whether a distance of each of the plurality of radio frequency identification tags from the tag reader is in accordance with the distance threshold and distance condition by being within the distance threshold from the management device.

7. The method of claim 6, wherein the filtering criteria specifies to include a data storage system in the set if the data storage system is less than the distance threshold.

8. The method of claim 6, wherein the filtering criteria includes any of a utilization metric, a metric related to health of a data storage system, a metric related to storage capacity of a data storage system, criteria related to software on a data storage system, criteria related to configuration information of a data storage system.

9. The method of claim 8, wherein the filtering criteria includes criteria related to any of a power source of a data storage system, physical drive information, and logical storage configuration information.

10. The method of claim 4, wherein the distance from the tag reader determined for each of the plurality of radio frequency identification tags is determined using one or more signals transmitted from said each radio frequency identification tag.

11. The method of claim 6, further comprising:
obtaining additional information for each data storage system including one of the plurality of radio frequency identification tags determined to have an associated distance from the tag reader that is in accordance with the distance threshold and distance condition.

12. A system comprising:
a plurality of data storage systems, each of the plurality of data storage systems including an identification tag that wirelessly transmits information including a unique identifier uniquely identifying said each data storage system;
a tag reader that reads signals transmitted wirelessly by identification tags; and
a management device comprising a processor and a non-transitory computer readable medium including code stored thereon that, when executed, performs a method comprising:
receiving filtering criteria including a distance threshold, an associated distance condition denoting a distance from any of said tag reader and the management device, and other criteria to identify any data storage system meeting the distance threshold and the associated distance condition and wherein said any data storage system has any of its data backup and data replication copy stored on another data storage system also meeting the distance threshold and the associated distance condition;
determining a set of one or more of the plurality of data storage systems meeting the filtering criteria, wherein the set of one or more data storage systems includes at least one data storage array and wherein the filtering criteria indicate that the set determined includes data storage systems located within the distance threshold from the management device and wherein each data storage system of the set has any of its data backup and data replication copy stored on a target that is another data storage system of the set;
displaying information on the management device regarding the set of data storage systems meeting the filtering criteria; and
for each data storage system of the set, performing any of: reconfiguring the target to be a new target data storage system not included in the set, and physically relocating the target to a different physical location from said each data storage system.

13. The system of claim 12, wherein the non-transitory computer readable medium of the management device further comprises code stored thereon that, when executed performs further processing of the method comprising:
controlling operation of the tag reader, whereby the tag reader receives a plurality of unique identifiers each transmitted wirelessly by an identification tag included on one of the plurality of data storage systems and said controlling provides for the tag reader communicating the plurality of unique identifiers to the management device.

14. The system of claim 13, wherein the non-transitory computer readable medium of the management device further comprises code stored thereon that, when executed, performs further processing of the method comprising:
determining a distance between each of a plurality of identification tags that wirelessly transmits one of the plurality of unique identifier and any of said tag reader and said management device, wherein said distance represents a distance between one of the plurality of data storage systems including said each identification tag and any of said tag reader and said management device;
determining an address of one of the plurality of data storage systems using one of the unique identifiers; and
communicating with said one data storage system using said address to obtain additional information regarding said one data storage system.

15. The system of claim 12, wherein the identification tag included on each of the plurality of data storage systems is any of read-only, read-write, and write once read many and the identification tag is any of a radio frequency identification tag and an infrared identification tag.

16. A non-transitory computer readable medium comprising code stored thereon that, when executed, performs a method for determining a list of data storage systems, the method comprising:
receiving at a management device filtering criteria including a distance threshold, an associated distance condition denoting a distance from the management device, and other criteria to identify any data storage system meeting the distance threshold and the associated distance condition and wherein said any data storage system has any of its data backup and data replication copy stored on another data storage system also meeting the distance threshold and the associated distance condition;
determining a set of one or more data storage systems meeting the filtering criteria, wherein the set of one or more data storage systems includes at least one data storage array and wherein the filtering criteria indicate that the set determined includes data storage systems located within the distance threshold from the management device and wherein each data storage system of the set has any of its data backup and data replication copy stored on a target that is another data storage system of the set;
displaying information regarding the set of data storage systems meeting the filtering criteria; and
for each data storage system of the set, performing any of: reconfiguring the target to be a new target data storage system not included in the set, and physically relocating the target to a different physical location from said each data storage system.

17. The non-transitory computer readable medium of claim 16, wherein each data storage system includes a radio frequency identification tag that transmits a unique identifier uniquely identifying said each data storage system to a tag reader.

18. The non-transitory computer readable medium of claim 17, wherein the tag reader is included as an integrated component of the management device or is otherwise in electronic communication with the management device, and the non-transitory computer readable medium further comprises code that, when executed, performs further processing of the method comprising:
receiving, by the tag reader, a plurality of unique identifiers transmitted from a plurality of radio frequency identification tags, each of the plurality of radio frequency identification tags being included on a different one of the plurality of data storage systems and used to uniquely identify said different one of the plurality of data storage systems;

determining a distance of each of the plurality of radio frequency identification tags from the tag reader whereby the distance is a distance between the tag reader and one of the data storage systems including said each radio frequency identification tag; and determining, in accordance with the filtering criteria, a first set of one or more of the plurality of unique identifiers each associated with one of the plurality of radio frequency identification tags.

* * * * *